J. MACINANTE.
PROPULSION OF AERIAL OR WATER VEHICLES.
APPLICATION FILED OCT. 21, 1914.

1,326,760.

Patented Dec. 30, 1919.
6 SHEETS—SHEET 1.

Witnesses
M. E. McDade.

Inventor
Joseph Macinante

J. MACINANTE.
PROPULSION OF AERIAL OR WATER VEHICLES.
APPLICATION FILED OCT. 21, 1914.
1,326,760.
Patented Dec. 30, 1919.
6 SHEETS—SHEET 2.
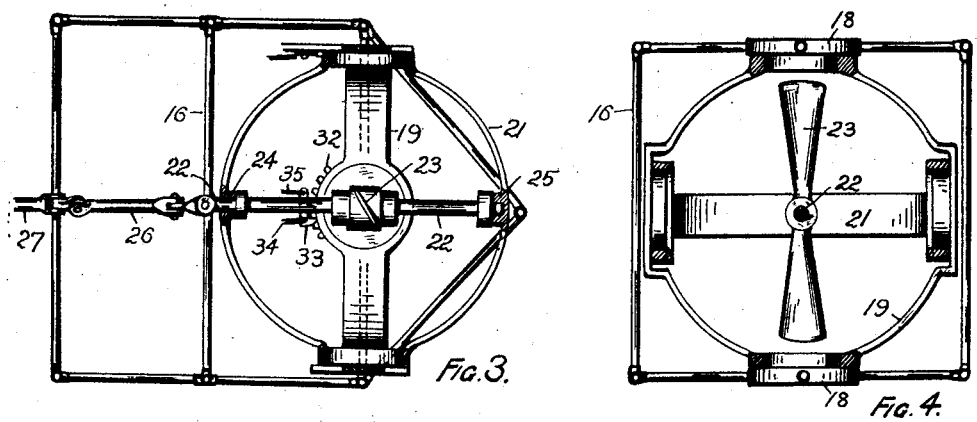
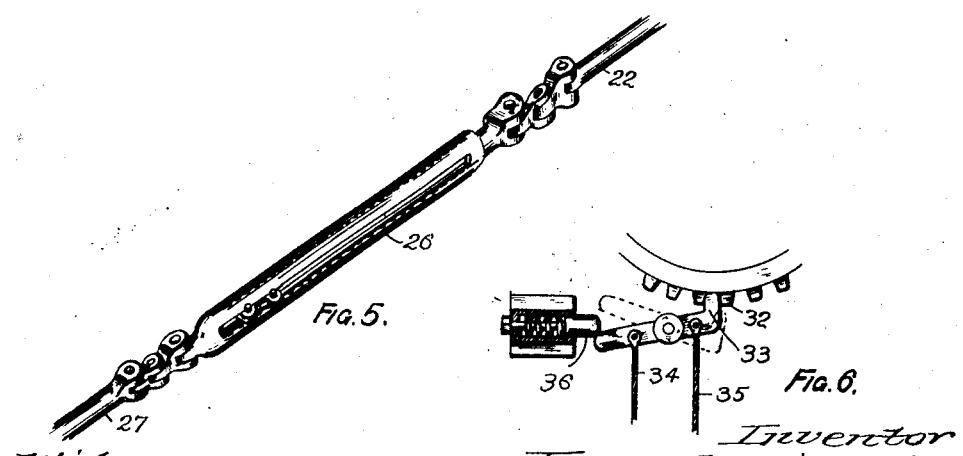

J. MACINANTE.
PROPULSION OF AERIAL OR WATER VEHICLES.
APPLICATION FILED OCT. 21, 1914.

1,326,760.

Patented Dec. 30, 1919.
6 SHEETS—SHEET 3.

J. MACINANTE.
PROPULSION OF AERIAL OR WATER VEHICLES.
APPLICATION FILED OCT. 21, 1914.

UNITED STATES PATENT OFFICE.

JOSEPH MACINANTE, OF PADDINGTON, NEAR SYDNEY, NEW SOUTH WALES, AUSTRALIA.

PROPULSION OF AERIAL OR WATER VEHICLES.

1,326,760.           Specification of Letters Patent.       Patented Dec. 30, 1919.

Application filed October 21, 1914. Serial No. 867,918.

*To all whom it may concern:*

Be it known that I, JOSEPH MACINANTE, a subject of the King of Italy, residing at No. 60 Hargrave street, Paddington, near Sydney, in the State of New South Wales, Commonwealth of Australia, have invented certain new and useful Improvements in the Propulsion of Aerial or Water Vehicles, of which the following is a specification.

This invention relates to improvements in the propulsion of aerial vehicles such as aeroplanes or airships or water vehicles as aero-hydroplanes. The principal object of my invention is to insure a normally horizontal propulsion irrespective of the position which the hull or body of the vehicle may take.

The invention is applied as a tractor at the front of the vehicle and consists of a skeleton frame rigidly secured to the hull or body of the vehicle and supporting inner and outer rings. The outer ring is capable of swiveling or pivoting in vertical bearings or trunnions in said frame while the inner ring carries a shaft which is normally parallel with the longitudinal axis of the vehicle, said shaft having the tractive blades or other means. The inner ring is capable of swiveling or pivoting in bearings or trunnions in the outer ring which bearings are at right angles to the bearings in the frame. The blades are secured to the shaft in such a position that the center of the boss may be on, say, the geometrical center of the inner and outer rings and also on the center of imaginary horizontal and perpendicular lines drawn between the center of all the bearings. The movements of either ring may be controlled by suitable devices which are so mounted and operated as to be capable of locking the inner ring relatively to the outer one without interfering with the movement of the latter relatively to the frame, or locking the frame or body around the outer ring without interfering with the movements of the inner ring relatively to the outer one. Provision is also made for locking both rings at the same time so that the frame and rings may, if required, become a rigid structure, permitting motion being imparted to the vehicle as if by a rigid shaft in the ordinary manner.

The tractor may be driven through a universal jointed telescopic shaft or through a rotary motor on the shaft.

By means of my invention the gyroscopic effect of the tractor alone, or that of the tractor and its engine, causes the inner ring to be maintained in its horizontal position within the outer one and normally permits (that is to say when the locking devices are not made use of) the frame and body to assume angular positions relatively to the propelling means or to the line of propulsion. Should it be desired to utilize the tractor for steering purposes controlling means such as ropes may be made use of to direct the shaft carrying the blades in the desired direction. I may however provide suitable planes or rudders for steering purposes.

Referring to the drawings herewith:—

Figure 1 is a perspective view of one form of construction embodying my invention, while, Figs. 2, 3, and 4, are sections on the lines 2—2, 3—3, and 4—4, Fig. 1.

Fig. 5 is a perspective of the telescopic universal shaft coupling.

Fig. 6 is an elevation partly in section of the locking device.

Fig. 7 is a perspective view showing a modification wherein the propeller is provided with an internal combustion engine as the source of motive power, while.

Fig. 12 is a perspective view of the invention applied to a dirigible or airship, while.

The same numerals indicate the same or corresponding parts.

Figure 1:
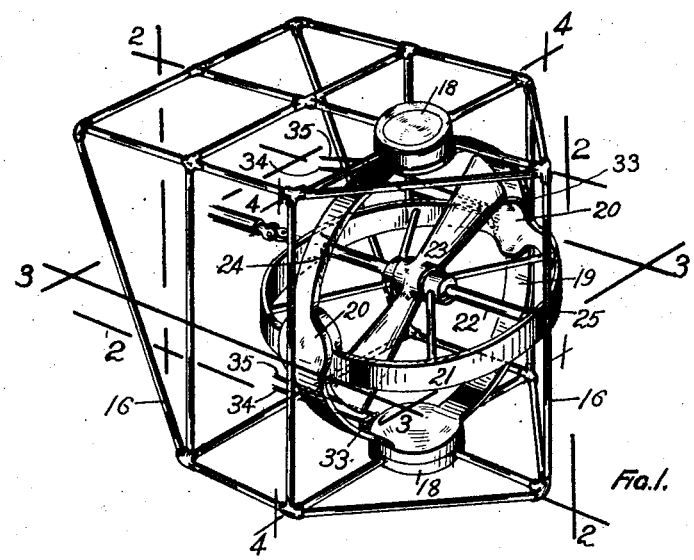
Figure 2:
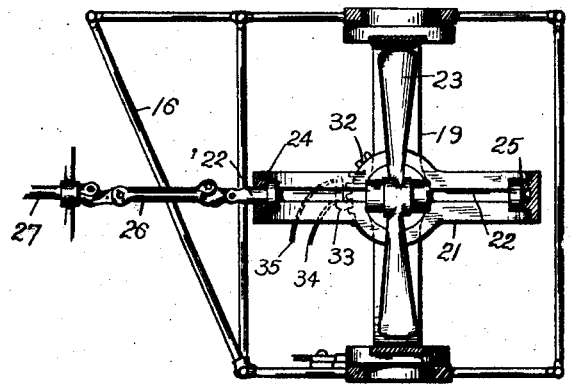
Figure 7:
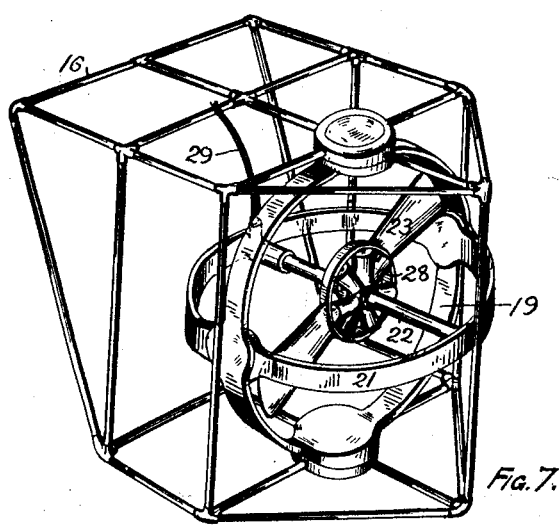
Figure 8:
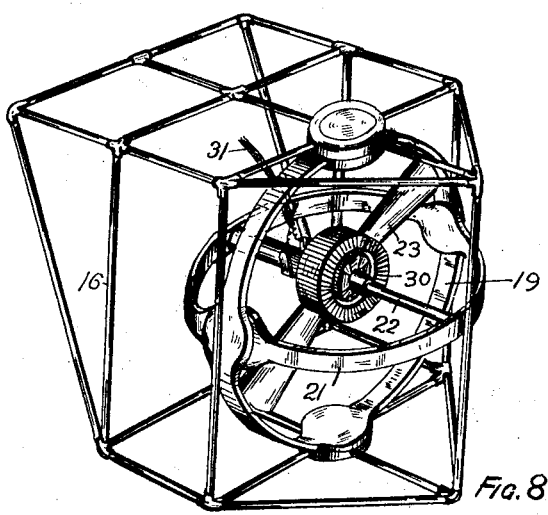
Fig. 8 is a similar view of another modification wherein the motive power is furnished by an electric motor.
Figure 9:
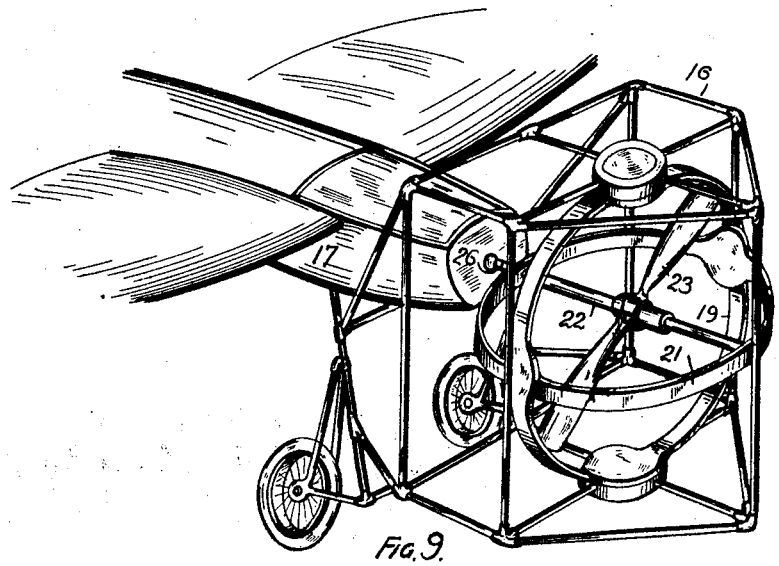
Fig. 9 is a perspective view illustrating the invention applied to an aeroplane.

16 is a skeleton frame rigidly secured to the hull 17 of the vehicle. The bearings 18 at the upper and lower sides of said frame retain the vertical trunnions of an outer gimbal ring 19 having bearings 20 which retains the trunnions of an inner gimbal ring 21. Transversely in the ring 21 is the tail shaft 22 carrying propeller blades 23 and having bearings at 24 and 25. In Figs. 1 to 5 and 9 to 15, the shaft 22 is connected by a telescopic universal coupling 26 to the main shaft 27. In Fig. 7, 28 is an engine of the Gnome type and 29 is a flexible pipe connection from a carbureter or the liquid fuel supply to the shaft 22 which in this case is hollow. In Fig. 8, 30 is an electric motor connected by the conductors 31 to a dynamo carried by the vehicle.

32 is a quadrant the teeth of which are capable of being engaged by the pawls 33 controlled by the cords 34 and 35 and spring catch 36. One of said quadrants is secured say on the top or around the pivot of the outer ring and has its pawl and catch on the frame 16. A similar quadrant is secured on or around one of the pivots of the inner ring to one side of the inner ring and has its pawl and catch on or in its respective bearing situated laterally in the center of the outer ring. Both rings may be locked in position enabling the driving to be made as in an ordinary tractor or propeller. Where a main shaft as 27 is employed it is obvious that it is essential to make the universal coupling 26 connecting the tail shaft 23 telescopic in order to permit the tail shaft to take up a varying position relatively thereto or rather the main shaft and hull with the tail shaft.

In the applications illustrated in Figs. 7 and 8, it will be necessary to provide an amount of flexibility to the pipe conveying the fuel supply in the former and the conducting wire to the electric motor in the latter.

Figure 10:
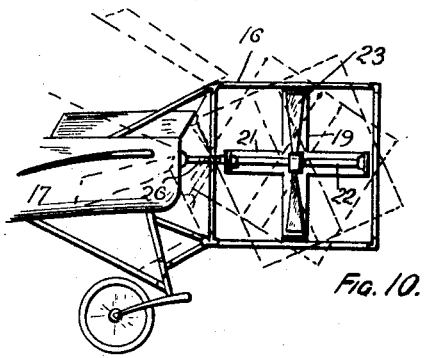
Figs. 10 and 11 are diagrammatic views illustrating the positions which the aeroplane or vehicle may take relatively to the propelling means.
Figure 11:
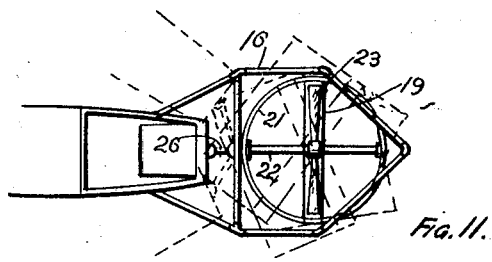
Figure 12:
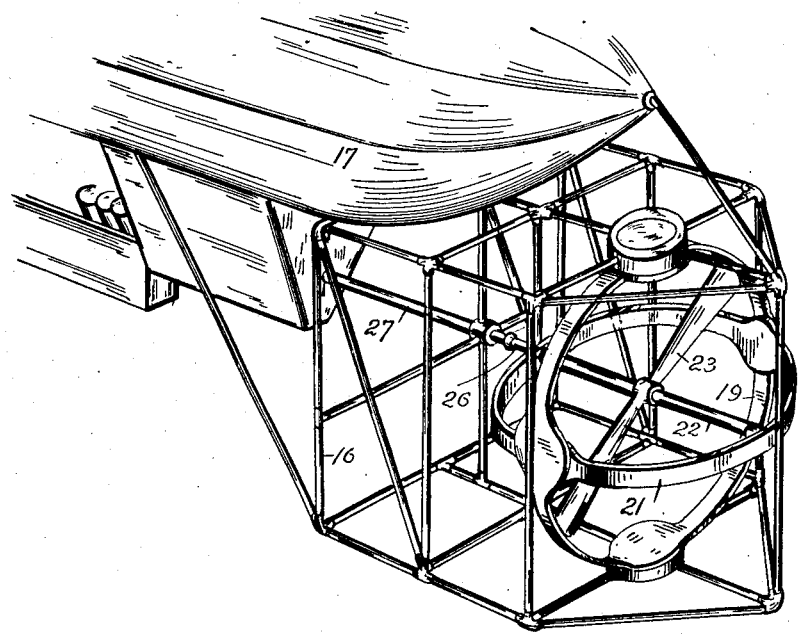
Figure 13:
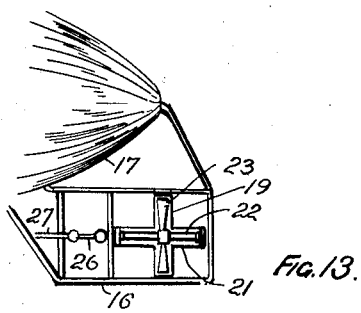
Fig. 13 is an elevation.
Figure 14:
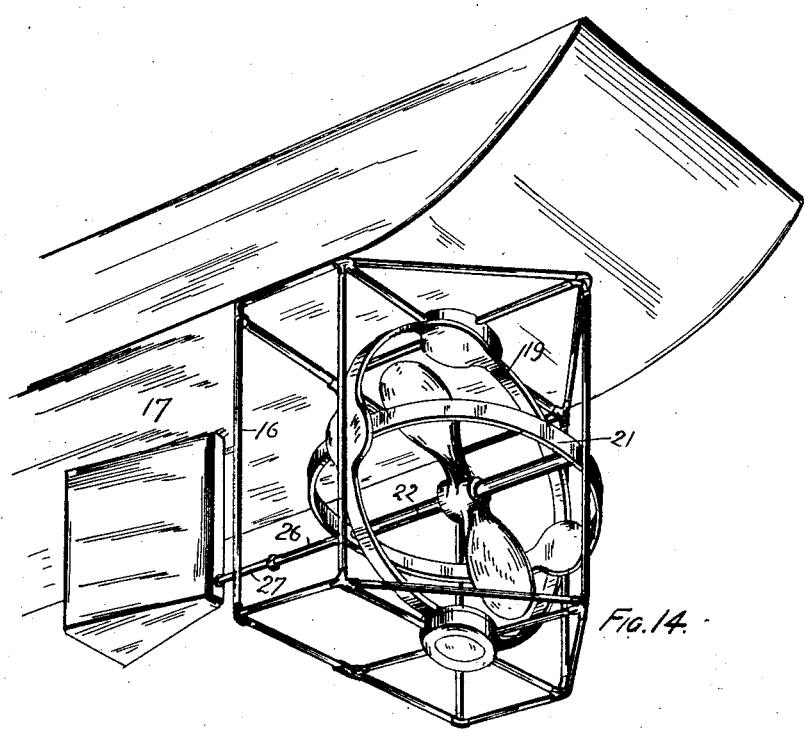
Fig. 14 illustrates in perspective the invention applied to the hull of an aero-hydroplane.
Figure 15:
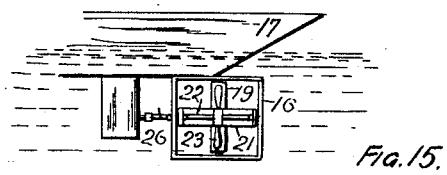
Fig. 15 is an elevation.

In Figs. 10 and 11, I have illustrated diagrammatically and in dotted lines the positions which the hull and frame may assume relatively to the shaft carrying the blades which remains substantially in the same horizontal plane.

In addition to land wheels on the hull I may mount other wheels laterally on the inner ring in order to minimize any danger of injury to the vehicle and also to facilitate rising from the surface.

Having thus described my invention, what I claim as new and desire to protect by Letters Patent, is:—

1. In aerial or water vehicles, the combination with the body of the vehicle, of a frame rigidly secured thereto, outer and inner gimbals pivoted together, one of which is pivotally supported in bearings in said frame with its pivotal axis at right angles to the pivotal axis of the other gimbal, and propelling means carried within either or both of said gimbals or respective prolongations thereof adapted to automatically maintain the normal or any given position or direction relatively to the earth independently of pitching or rolling movements of the other gimbal and of any movement which the body or lifting surface may temporarily make relatively to the gimbals and to the earth.

2. In aerial or water vehicles, the combination with the body of the vehicle, of a frame rigidly secured thereto, outer and inner gimbals pivoted together, one of which is pivotally supported in bearings in said frame with its pivotal axis at right angles to the pivotal axis of the other gimbal and a motor within either or both of said gimbals or prolongations thereof which are adapted to carry one or more propellers and to automatically maintain the normal or any given position or direction relatively to the earth independently of pitching or rolling movements of the other gimbal and of any movement which the body or lifting surface may temporarily make relatively to the gimbals and to the earth.

3. In aerial or water vehicles, a gimbal or a combination of gimbals or prolongations thereof adapted to carry within the inner one or the respective prolongations one or more propellers and to automatically maintain the normal or any given position or direction relatively to the earth independently of pitching or rolling movements of the other gimbal and of any movement which the body or lifting surface may temporarily make relatively to the gimbals and to the earth.

4. In aerial or water vehicles, a gimbal or a combination of gimbals or prolongations thereof adapted to carry within the inner one or the respective prolongations one or more propellers and motors and to automatically maintain the normal or any given position or direction relatively to the earth independently of pitching or rolling movements of the other gimbal and of any movement which the body or lifting surface may temporarily make relatively to the gimbals and to the earth.

5. In the propelling apparatus of aerial or water vehicles, in combination, a body having a frame rigidly secured thereto, an outer gimbal or gimbals or prolongations thereof pivoted in said frame, an inner gimbal capable of swiveling on the outer gimbal, and a shaft within said inner gimbal or respective prolongations adapted to maintain the normal or arranged position relatively to the earth independently of the movements which the other gimbal and the body may temporarily make relatively to each other or to the gimbal carrying said shaft.

6. In aerial or water vehicles, a body having a frame rigidly secured thereto, an outer gimbal pivoted in said frame, an inner gimbal capable of swiveling on the outer gimbal, a shaft within either or both of said gimbals or respective prolongations and propelling means carried or actuated thereby and adapted to maintain the normal or arranged position relatively to the earth independently of the movements which the other gimbal and the body may temporarily make relatively to each other or to the gimbal carrying said shaft.

7. In the propelling apparatus of aerial or water vehicles, in combination, a body having a frame rigidly secured thereto, an outer gimbal pivoted in said frame, an inner gimbal capable of swiveling on the outer gimbal, a shaft within either or both of said gimbals or prolongations thereof, a motor on said shaft adapted to maintain the normal or arranged position relatively to the earth independently of the movements which the other gimbal and the body may temporarily make relatively to each other or to the gimbal carrying said shaft and motor.

8. In aerial or water vehicles, in combination, a body having a frame rigidly secured thereto, an outer gimbal pivoted on said frame, an inner gimbal capable of swiveling on the outer gimbal, a shaft within either or both of said gimbals or prolongations thereof, a motor on said shaft adapted to maintain the normal or prearranged position relatively to the earth independently of the movements which the other gimbal and the body may temporarily make relatively to each other or to the gimbal carrying said shaft and motor, and propelling means carried or actuated by said motor.

9. In aerial or water vehicles, in combination, a body having a frame rigidly secured thereto, an outer gimbal pivoted in said frame, propelling means carried or actuated by a motor and a shaft located in an inner gimbal capable of swiveling in said outer gimbal and of being set in and automatically maintaining any desired direction or position relatively to the earth independently of any movement which the body or lifting surface may temporarily make relatively to the gimbals and to the earth.

10. In aerial or water vehicles, in combination, a body having a frame rigidly secured thereto, an outer gimbal pivoted in said frame, an inner gimbal capable of swiveling on the outer gimbal, a motor within said gimbals which are adapted to carry one or more propellers capable of acting gyroscopically to maintain a given position or direction relatively to the earth independently of any movement which the body or lifting surface may temporarily make relatively to the gimbals and to the earth.

11. In aerial or water vehicles, in combination, a body having a frame rigidly secured thereto, an outer gimbal pivoted in said frame, an inner gimbal capable of swiveling on the outer gimbal, a motor within said gimbals adapted to carry one or more propellers capable of changing position or direction relatively to the earth and to the body or lifting surface in gyroscopic precession to a position or direction at right angles to any suitable force applied on the respective axes of the device.

12. In aerial or water vehicles, the motive plant or respective propeller or propellers or both the motive plant and propellers carried within the inner of a combination of gimbals or the respective prolongations of same capable of acting gyroscopically in maintaining a given position or direction relatively to the earth independently of any movement which the body or lifting surface may temporarily make, relatively to the gimbals and to the earth and capable also of precess to any position or direction at right angles to any suitable force applied on the respective axes of the device.

13. In aerial or water vehicles, in combination, a body having a frame rigidly secured thereto, an outer gimbal pivoted in said frame, an inner gimbal capable of swiveling on the outer gimbal, a shaft having its bearings on said inner gimbal, a motor on said shaft, propelling means carried by said motor, means to control the displacement of the gimbals from their prearranged position relatively to each other or to said frame, and means to lock said gimbals to one another or to said frame.

14. In aerial or water vehicles, in combination, a body having a frame rigidly secured thereto, an outer gimbal pivoted in said frame, an inner gimbal capable of swiveling on the outer gimbal, a shaft having its bearings on said inner gimbal, a motor on said shaft, propelling means carried by said motor, toothed racks associated with certain pivots of the gimbals and pawls mounted on the respective bearings for said pivots and provided with control cords.

15. In the propelling apparatus of aerial or water vehicles, in combination, a body having a frame rigidly secured thereto, a pair of pivotally connected gimbals, one of which is pivotally supported in said frame with its pivotal axis at a right angle to the pivotal axis of the other gimbal, and means associated with one of the pivots of the first-named gimbal for locking it to the frame.

16. In the propelling apparatus of aerial or water vehicles, in combination, a body having a frame rigidly secured thereto, a pair of pivotally connected gimbals, one of which is pivotally supported in said frame with its pivotal axis at a right angle to the pivotal axis of the other gimbal, and means associated with one of the pivots of the latter gimbal for locking it to the other gimbal.

17. In aerial or water vehicles, in combination, a body having a frame rigidly secured thereto, a pair of pivotally connected gimbals, one of which is pivoted in said frame, means associated with one of the pivots of the last-named gimbal for locking it to said frame, and a propeller carried within said gimbals.

18. In the propelling apparatus of aerial or water vehicles, in combination, a body having a frame rigidly secured thereto, a pair of pivotally connected gimbals, one of which is pivotally supported in said frame with its pivotal axis at a right angle to the pivotal axis of the other gimbal, means associated with one of the pivots of the latter gimbal for locking it to the other gimbal, and a propeller carried within said gimbals, capable of automatically maintaining the prearranged position of either or both of the gimbals.

19. In the propelling apparatus of aerial or water vehicles, in combination, a body having a frame rigidly secured thereto, a pair of pivotally connected gimbals, one of which is pivotally supported in said frame with its pivotal axis at a right angle to the pivotal axis of the other gimbal, means associated with one of the pivots of the latter gimbal for locking it to the other gimbal, and a motor carried within said gimbals.

20. In the propelling apparatus of aerial or water vehicles, in combination, a body having a frame rigidly secured thereto, a pair of pivotally connected gimbals, one of which is pivotally supported in said frame with its pivotal axis at a right angle to the pivotal axis of the other gimbal, means associated with one of the pivots of the latter gimbal for locking it to the other gimbal, and a motor within said gimbals capable of automatically maintaining the prearranged position of either or both gimbals.

21. In the propelling apparatus of aerial or water vehicles, in combination, a body having a frame rigidly secured thereto, a pair of pivotally connected gimbals, one of which is pivotally supported in said frame with its pivotal axis at a right angle to the pivotal axis of the other gimbal, means associated with one of the pivots of the latter gimbal for locking it to the other gimbal, a motor within said gimbals, and a propeller carried by said motor within said gimbals capable of automatically maintaining the prearranged position of either or both gimbals.

In testimony whereof I have hereunto set my hand in presence of two subscribing witnesses.

JOSEPH MACINANTE.

Witnesses:
CHARLES E. GRAHAM,
HENRY W. CLARKE.